Jan. 11, 1966  N. B. AKITT ETAL  3,228,349
COMBINED LOCOMOTIVE AND PONY TRUCK
Filed April 11, 1961  4 Sheets-Sheet 1
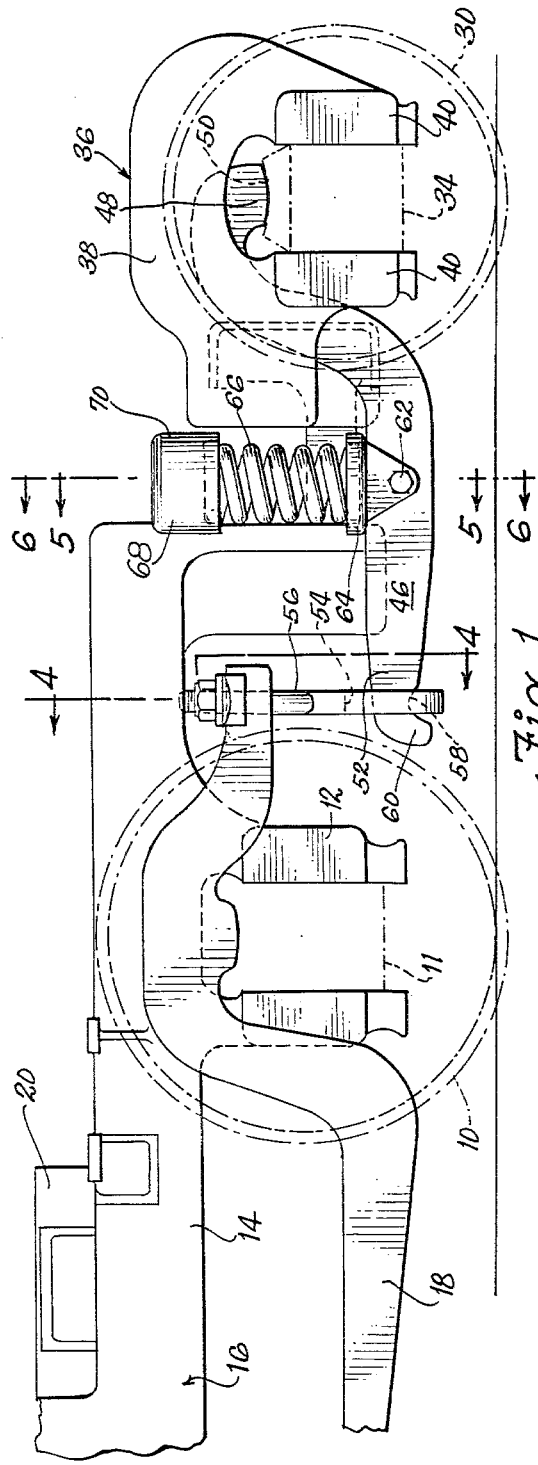
INVENTORS
Norman B. Akitt
Thomas A. Hurtner
BY
Ooms, McDougall,
Williams and Hersh
Attys

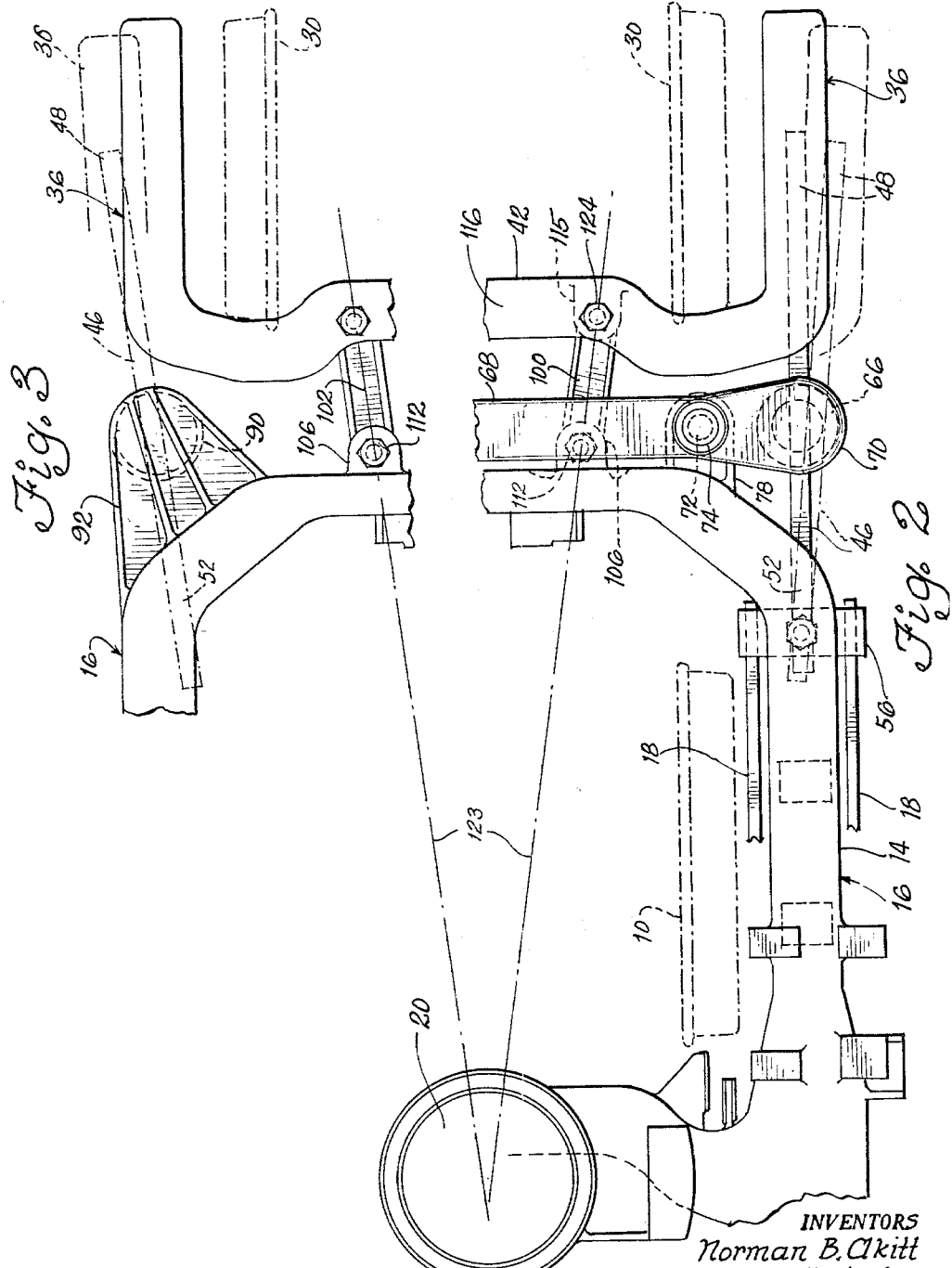

Jan. 11, 1966   N. B. AKITT ETAL   3,228,349
COMBINED LOCOMOTIVE AND PONY TRUCK
Filed April 11, 1961   4 Sheets-Sheet 3

INVENTORS
Norman B. Akitt
BY Thomas A. Hurtner
Derns, McDougall,
Williams and Hersh
Attys Jan. 11, 1966  N. B. AKITT ETAL  3,228,349
COMBINED LOCOMOTIVE AND PONY TRUCK
Filed April 11, 1961  4 Sheets-Sheet 4

INVENTORS
Norman B. Akitt
BY Thomas A. Nurtner
Jones, McDougall,
Williams and Hersh
Attys

United States Patent Office 3,228,349
Patented Jan. 11, 1966

3,228,349
COMBINED LOCOMOTIVE AND PONY TRUCK
Norman B. Akitt, Schenectady, and Thomas A. Hurtner, Latham, N.Y., assignors to Adirondack Steel Casting Co., Watervliet, N.Y.
Filed Apr. 11, 1961, Ser. No. 102,272
9 Claims. (Cl. 105—175)

This invention relates to the construction of a truck for locomotives and more particularly to a fully equalized swiveled pony truck arranged in operative connection with the main truck of a locomotive.

It has been the practice in the past to extend the main frame forwardly to the load bearing center plate of the pony truck whereby the weight of the main frame is greatly increased and whereby the extension of the main frame by as much as 5 feet to the center plate of the pony truck greatly increases the bending moments through the extension thereby either to reduce the load carrying capacity of the structure or otherwise to increase the amount of metal required to incorporate sufficient strength safely to withstand the bending moments which are raised in normal use as the truck rides over uneven surfaces encountered while under load.

The construction to extend the main frame to the load bearing center plate of the pony truck, as illustrated in FIG. 9, minimizes the ability to transmit load back to the main frame. Such inability to carry back the load is believed at least in part to be a cause for derailment experienced with such constructions. Further, extension of the main frame to the load bearing center plate of the pony truck operates to subject the pony truck to loads carried forward from the main frame thereby to impose additional requirements for strength and materials in the construction with corresponding increase in the cost.

It is an object of this invention to produce a pony truck and main frame combination for locomotives which is free of the objectionable characteristics attributed to construction of the type heretofore described.

More specifically, it is an object of this invention to produce a swiveled pony truck and main frame for locomotives in which the load on the pony truck is capable of being carried back to the equalizers of the main frame thereby uniformly to distribute load; in which the load carrying center plate of the pony truck is relatively free of the load on the main frame or in which the load on the main frame is not directly carried forward through a rigid extension to the center plate of the pony truck; in which the pony truck is connected by a swivel connection to the main frame to enable the pony truck to follow the road bed while being able to carry the load back to the main frame thereby to avoid the development of conditions heretofore believed to be at least in part responsible for derailments; in which the pony truck can be constructed at lower cost with increase in load carrying capacity and with improvements in the guiding relationship; and which is simple and sturdy in construction and easy, safe and efficient in operation.

These and other objects and advantages of this invention will hereinafter appear and for purposes of illustration, but not of limitation, embodiments of the invention are shown in the accompanying drawings in which:

FIG. 1 is an elevational view of the pony truck embodying the feature of this invention in operative connection with a fragmentary portion of the main frame;

FIG. 2 is a fragmentary top plan view of the pony truck and main frame shown in FIG. 1;

FIG. 3 is a fragmentary top plan view of a portion of the illustration made in FIG. 2, showing a modification in the construction;

FIG. 4 is a sectional view taken along the line 4—4 of FIG. 1;

FIG. 5 is a sectional view taken along the line 5—5 of FIG. 1;

FIG. 6 is a sectional view taken about the line 6—6 of FIGURE 1, the view corresponding to that of FIG. 5 but showing the modification of FIG. 3;

In accordance with the practice of this invention, the lead pony truck is formed separate and apart from the main truck with operative connections therebetween for the transmission of load back from the pony truck frame to the main frame for the equalization of load while, at the same time, permitting freedom of swiveling movement of the pony truck independent of the main frame thereby to provide a number of advantages over a single frame arrangement of the type heretofore employed including (1) shortening of the main frame with corresponding reduction in weight and cost; (2) reduction in the high bending moments which arise when the pony frame constitutes a mere extension of the main frame; (3) flexibility in operation permitting swiveling movement of the pony truck independent of the main frame thereby to avoid conditions which have heretofore been instrumental in causing derailments and the like in use; and (4) allowing use over less stable road beds of the type available in many of the outlying sections and in countries foreign to the United States without danger of excessive loading of the tracks or without danger of derailments because of the non-uniformities therein.

Figure 10:
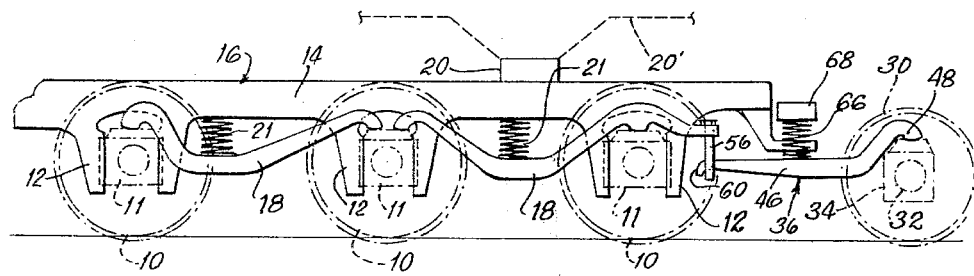
FIG. 10 is a schematic elevational sectional view similar to that of FIG. 9 illustrating the practice of this invention with one type of equalizer arrangement.
Figure 11:
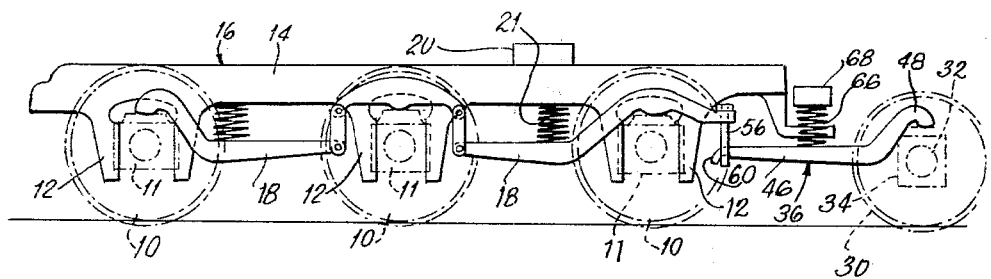
FIG. 11 is a schematic elevational view similar to that of FIG. 10 showing the practice of this invention with another type of equalizer arrangement.

Referring first to the main truck, it is of the usual construction comprising wheels 10 rotatably supported at their ends in journal boxes 11 which are slidably received for vertical shifting movement within pairs of pedestals 12 depending from the side member 14 or wheel bases of the main frame 16. The load bearing center plate 20 in supporting engagement with locomotive body 20' (a portion of which is shown in dotted lines, FIGURE 10) forms a part of the main frame or is otherwise supported from the main frame by bolsters operatively connected to the main frame in the usual manner, as by swing hangers, transoms and the like. Equalizers 18 of the conventional type, illustrated in FIG. 10, or of the Dolphin type, illustrated in FIG. 11, are supported at their ends on the journal boxes and the equalizers in turn mount springs 21 which carry the main truck frame.

To the present, description has been made briefly of elements of conventional construction making up the main frame. Hereafter, description will be made of the important concepts of this invention including the pony truck, its support and its swivel connections with the main truck frame for the distribution and transmission of load therebetween and for operation in combination with the main truck frame as a load carrying and guiding means.

Referring now to FIGS. 1, 2 and 5, the pony truck includes the usual elements comprising a pair of wheels 30; an axle 32 on which the wheels are mounted; journal boxes 34 on the ends of the axles; a pony main frame 36 having side plates 38 from which pairs of pedestals 40 depend for slidably receiving the journal boxes 34 therein; and a transverse transom 42 forming a part of the main frame.

Each side of the pony truck is provided with equalizer bars 46 having their forward end portions 48 resting on the curvilinear top 50 portion of the journal box 34 for support while the rearward end portion 52 of the equalizer bars extends through an opening 54 provided in the lower end portion of a hanger rod 56 suspended at its upper end from the forward end of the equalizer member 18 of the main truck frame. For this purpose, the pony truck equalizer 46 is formed with a recessed portion 58 in the underside adjacent the end for receiving the hanger rod 56 in nesting relationship therein. The rear end portion of the equalizer bar 46 is also provided with a downwardly extending lip 60 to militate against disengagement between the equalizer 46 and rod 56 without intentionally lifting the end portion of the rod for endwise displacement through the opening.

Intermediate the ends, the pony truck equalizer bar 46 is provided with an opening having a bolt 62 extending therethrough pivotally to mount a spring receiving cup member 64 on an intermediate portion thereof. The lower end portions of spring members 66 are seated within said pivotally mounted cup 64 for resiliently supporting a bolster 68 which extends crosswise between the equalizers in an area between the main truck frame and the pony truck frame. For this purpose, the bolster is provided with downwardly extending cup-shaped sections 70 in which the upper end portions of the coil springs 66 are seated. The bolster 68 is connected to the main truck frame 16 through one or more elongate bolts 72 having a head 74 on one end portion extending through the bolster and a nut 76 on the other end portion extending through a vertically aligned opening 77 in a bracket 78 rigid with the forward end portion of the main frame and extending forwardly therefrom. The bolster and bracket are provided with seats 80 and 82 having a concave surface for engagement by similarly shaped convex surfaces of spacers or washers 84 and 86 for the bolts with the openings 77 and 88 through the bracket and bolster being of greater dimension than that of the bolt portion extending therethrough whereby the bolster is free to rock relative to the truck frame about the curvilinear surfaces as the pivots.

Figure 7:
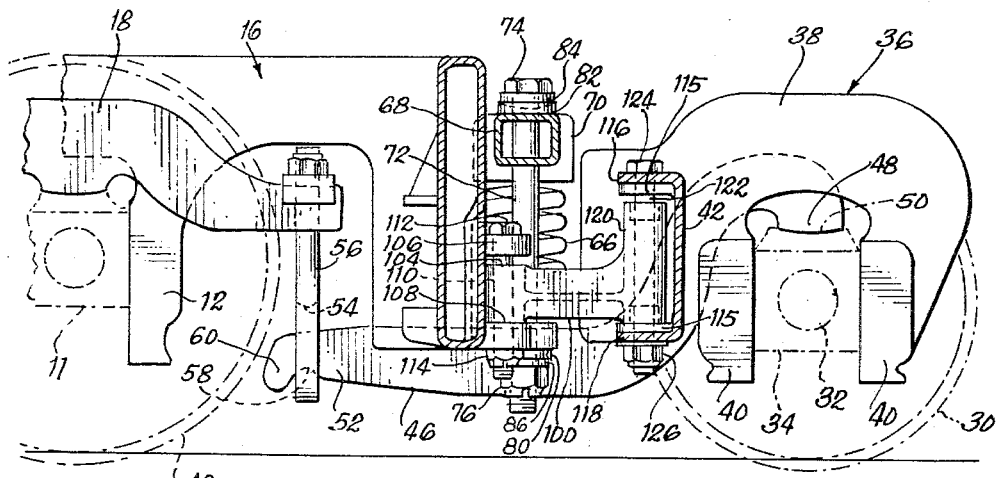
FIG. 7 is a sectional view taken about the line 7—7 of FIGURE 8.
Figure 8:
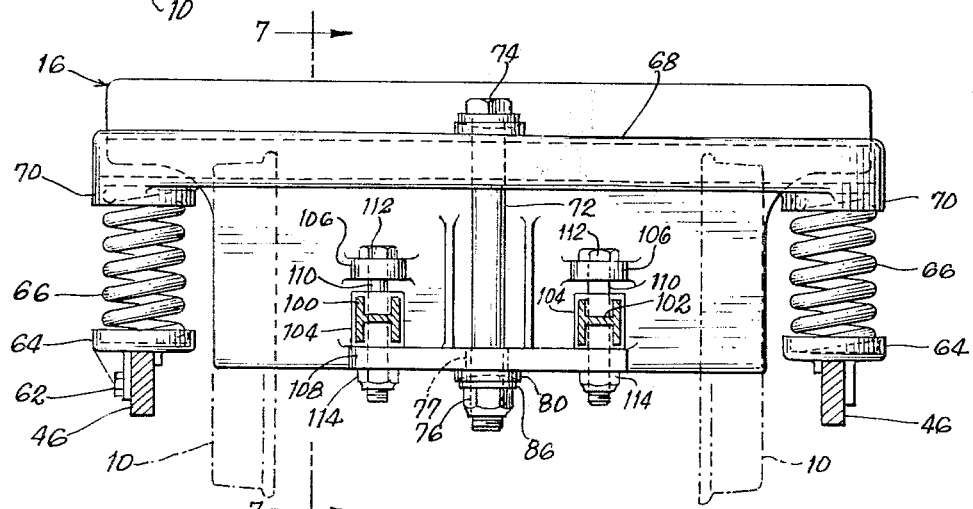
FIG. 8 is a sectional view similar to that of FIG. 5 showing a modification in the construction for connection between the pony truck and main frame.
Figure 9:
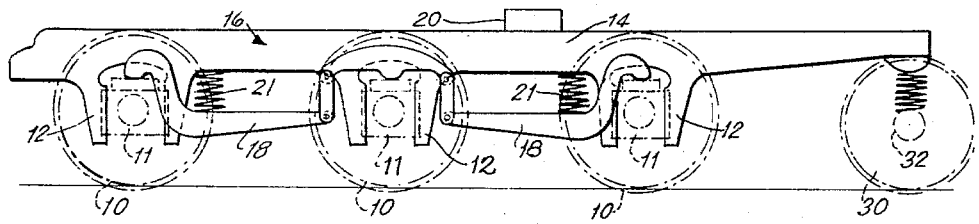
FIG. 9 is a schematic elevational view of the pony truck and main frame construction representative of prior practice.

It will be apparent from the illustrated embodiments that the bolster can be interconnected to the main frame through a pair of laterally spaced apart bolt assemblies, as illustrated in FIG. 5, or by a centrally located bolt assembly, as illustrated in FIG. 8, or combinations thereof.

Instead of making use of a bolster assembly of the type described, the equalizer supporting springs 66 can be received at their upper ends within downwardly extending cups 90 provided in brackets 92 extending forwardly rigidly from the opposite upper edge portions of the main frame members, as illustrated in FIGS. 3 and 6.

The main truck frame 16 and the pony truck frame 36 are provided with a swivel connection therebetween comprising a pair of laterally spaced apart, longitudinally extending connecting links 100 and 102, each of which is formed with a vertically disposed sleeve section 104 at the rearward end which extends vertically between aligned openings in vertically spaced apart, horizontally disposed ears or bracket plates 106 and 108 extending forwardly from the main frame. The sleeve and the brackets are interconnected in a manner to enable rotational movement of the sleeve relative to the main frame by means of a pin 110 which extends downwardly through an opening from a head 112 on one side of the bracket to a locking nut 114 on the opposite side of the other bracket.

A pair of laterally spaced apart bracket plates 115 are also secured to the rearward portion of the pony truck frame. Each of the brackets is formed with a vertically spaced apart pair of rearwardly extending horizontally disposed flanges 116 and 118 formed with aligned openings and between which a sleeve 120 of greater length on the forward end portion of the connecting links is disposed to enable a connecting pin 122 to extend through the aligned openings and the sleeve to establish a pivotal relationship therebetween. The pin is provided with a head 124 at one end and a locking nut 126 at the opposite end to maintain the described assembled relationship.

The connecting links are provided with the vertically disposed sleeves interfitting with the pins to enable swiveling movement of the pony truck relative to the main frame but in a manner which will militate against rocking movement of the pony truck relative to the main frame since the sleeve and pin connection will operate to provide stabilization against excessive amounts of such rocking movements.

For proper use of the pony truck as a load carrying member while enabling swiveling movements of the truck relative to the main frame, it is desirable radially to align the pivotal connections defined by the pins 110 and 122 with a common point along the center line of the main truck and preferably in radial alignment with the radius from the load carrying center plate of the main frame, as outlined by the broken lines 123 in FIGS. 2 and 3 of the drawings. Thus the pony truck will be able to swing through an arc having the center of the load carrying center plate 20 as its axis to compensate for turns in the road bed and to enable movement of the pony truck independent of the main frame without interfering with operation of the main frame or its load carrying capacity. Such relative or swiveling movements of the pony truck are not restricted by the bolster due to the resilient means by which the bolster is connected to the truck and such movements are also permitted by the equalizers by reason of the pivotal movement permitted between the rearward end portion of the equalizer, as a stiff member, and the hanger rod 56 on which it is pivotally supported.

It will be apparent from the description that loads to which the pony truck will be subjected during operation will be transmitted by the journal box 34 to the equalizer 46 which, when using the bolster as a pivot, will transmit the load rearwardly to the hanger rod 56 for immediate distribution to the equalizer system 18 of the main frame thereby immediately carrying back the load from the equalizers of the pony frame to the main frame equalizers for distribution and support.

It will be apparent also that the pony truck is free to swivel laterally as required relative to the main frame while maintaining control to prevent relative rocking movement thereby to permit the pony frame to operate not only as a guiding member but as a load carrying member without being exposed to such forces or conditions as have heretofore raised the possibilities of derailments responsive to the encounter of an unexpected load or obstruction in use.

The ability of the pony truck to function as a guiding member as well as a load carrying member in conjunction with the main frame while representing a member capable of substantially independent swiveling movement has enabled the elimination of extensions heretofore provided to the main frame thereby material reducing the weight of the main frame; thereby materially reducing the length of the main frame; thereby materially reducing the bending moments occasioned by the extension with corresponding reduction in the amount of metal required to withstand such high bending moments; and thereby also reducing the chances of derailment.

Separation of the pony truck with means for carrying back the load for distribution enables use of the locomotive over roads having lighter tracks and less firm road beds without decrease in the safety of operation and without sacrifice in the smoothness of operation.

It will be understood that changes may be made in the details of construction, arrangement and operation without departing from the spirit of the invention, especially as defined in the following claims.

We claim:

1. In a locomotive truck, the combination of a main truck and a pony truck, said main truck including wheels and axle supports therefor, main truck equalizer bars mounted on said wheel and axle supports extending along the sides of the main truck, and a main frame supported on said main truck equalizer bars, said wheels being associated in spaced relationship with respect to the main frame, said pony truck comprising wheels, journal boxes for enclosing the axle bearing structure for said wheels, pony truck equalizer bars, and a pony truck frame with said pony truck wheels being associated with the pony truck frame, the forward ends of said pony truck equalizer bars engaging said journal boxes, and the rearward ends of said pony truck equalizer bars being connected to the forward end portions of said main truck equalizer bars, a transom member connected to said main frame, resilient means connecting said transom member to said pony truck equalizer bars at a point intermediate the ends of said bars, and including link means pivotally connecting said main frame to said pony truck frame.

2. A locomotive truck as claimed in claim 1 in which the rearward end portion of said connecting link is pivotally connected to the forward end portion of the main truck frame for rotational movement of the link about a vertical axis, means pivotally connecting the forward end portion of the connecting link to a rearward portion of the pony truck frame for rotational movement of the link about a vertical axis, said pivotal link connections defining a line therebetween radiating from the load bearing center plate of the main truck frame as the axis.

3. A locomotive truck as claimed in claim 2 in which the means pivotally connecting the rearward end portion of the connecting link to the forward end portion of the main truck frame comprises a sleeve section on the rearward end portion of the link, ears having aligned openings extending forwardly from the main frame with the ears vertically spaced apart by an amount to receive the sleeve section therebetween, and a pin interconnecting the ears and the sleeve section in an assembled relation to permit rotational movement of the link about the pin while stabilizing the link against relative rocking movement.

4. A locomotive truck frame as claimed in claim 2 in which the means pivotally connecting the forward end portion of the connecting link to a rearward portion of the pony truck frame comprises a sleeve section on the forward end portion of the link, ears having aligned openings extending rearwardly from the pony truck frame with the ears being vertically spaced apart by an amount to receive the sleeve section therebetween, and a connecting pin extending through said ears and sleeve to effect an assembled relationship therebetween which permits rotational movement of the link about the pin while the latter stabilizes the link against relative rocking movement.

5. In a locomotive truck, the combination of a main truck and a pony truck, said main truck including wheels and axle supports therefor, main truck equalizer bars mounted on said wheel and axle supports extending along the sides of the main truck, and a main frame supported on said main truck equalizer bars, said wheels being associated in spaced relationship with respect to the main frame, said pony truck comprising wheels, journal boxes for enclosing the axle bearing structure for said wheels, pony truck equalizer bars, and a pony truck frame with said pony truck wheels being associated with the pony truck frame, the forward ends of said pony truck equalizer bars engaging said journal boxes, and the rearward ends of said pony truck equalizer bars being connected to the forward end portions of said main truck equalizer bars, a transom member connected to said main frame, resilient means mounted between said transom member and an intermediate point of said pony truck equalizer bars for resiliently connecting said transom member and said pony truck equalizer bars, said resilient means comprising a spring seat intermediate the ends of each of the pony truck equalizer bars, said transom member comprising a crosswise extending bolster having spring seats in the end portions thereof in vertical alignment with the spring seats on the equalizer bars, and a resilient spring member seated at its opposite ends in said spring seats, and including link means pivotally connecting said main frame to said pony truck frame.

6. An assembly as claimed in claim 5 in which the operative connection between the bolster and the main truck frame comprises a bracket extending forwardly from the main frame having an opening in vertical alignment with an opening in the bolster, a connecting pin extending through the aligned openings of the bolster and bracket for attachment therebetween, and curvilinear seats between elements rigid with the pin and elements rigid with the bolster and bracket for accommodating relative movements between the bolster and the bracket.

7. In a locomotive truck, the combination of a main truck and a pony truck, said main truck including wheels and axle supports therefor, main truck equalizer bars mounted on said wheel and axle supports extending along the sides of the main truck, and a main frame supported on said main truck equalizer bars, said wheels being associated in spaced relationship with respect to the main frame, said pony truck comprising wheels, journal boxes for enclosing the axle bearing structure for said wheels, pony truck equalizer bars, and a pony truck frame with said pony truck wheels being associated with the pony truck frame, the forward ends of said pony truck equalizer bars engaging said journal boxes, and the rearward ends of said pony truck equalizer bars being connected to the forward end portions of said main truck equalizer bars, a spring seat rigid with the forward end portion of the main frame, additional spring seats formed intermediate the ends of each of said pony truck equalizer bars, and a resilient spring member seated at its opposite ends in said spring seats to thereby resiliently support said main frame on said pony truck equalizer bars, and including link means pivotally connecting said main frame to said pony truck frame.

8. A structure as claimed in claim 7 in which the operative connection between the rearward end portion of the pony truck equalizers and the main frame equalizers comprises a hanger rod suspended from the forward end portion of the main frame equalizers, and means pivotally supporting said pony truck equalizers from the hanger rod in a manner to permit pivotal movements therebetween.

9. A structure as claimed in claim 8 in which the pivotal connection between the hanger rod and the pony truck equalizer comprises an opening in the hanger rod dimensioned to enable the rearward end portion of the pony truck equalizers to be displaced therebetween, and a lip extending downwardly from the through-extending portion of the equalizer to militate against inadvertent disengagement, said equalizer bar being constantly urged downwardly into engagement with the portion of said rod defining the lower end of said opening responsive to the resilient support intermediate the ends of the equalizers.

References Cited by the Examiner
UNITED STATES PATENTS

| | | | |
|---|---|---|---|
| 129,234 | 7/1872 | Hudson | 105—174 X |
| 227,029 | 4/1880 | Mason | 105—174 |
| 774,492 | 11/1904 | Pflager et al. | 105—188 |
| 1,094,524 | 4/1914 | Burnett | 106—166 |
| 1,099,376 | 6/1914 | Johnson et al. | 105—174 |
| 1,512,709 | 10/1924 | Pfeiffer | 105—82 |
| 1,576,762 | 3/1926 | Houston et al. | 105—174 |
| 1,676,259 | 7/1928 | Getchell | 105—174 |
| 2,523,375 | 9/1950 | Jones et al. | 105—194 |
| 2,908,230 | 10/1959 | Dean | 105—199 |
| 2,934,027 | 4/1960 | Applegate | 105—174 X |
| 2,962,981 | 12/1960 | Peras | 105—199 |
| 2,994,284 | 8/1961 | Travilla | 105—174 |

ARTHUR L. LA POINT, *Primary Examiner.*

JAMES S. SHANK, LEO QUACKENBUSH, *Examiners.*